H. W. DELZELL.
METHOD OF MAKING BELTS.
APPLICATION FILED OCT. 7, 1921.
1,432,973.
Patented Oct. 24, 1922.
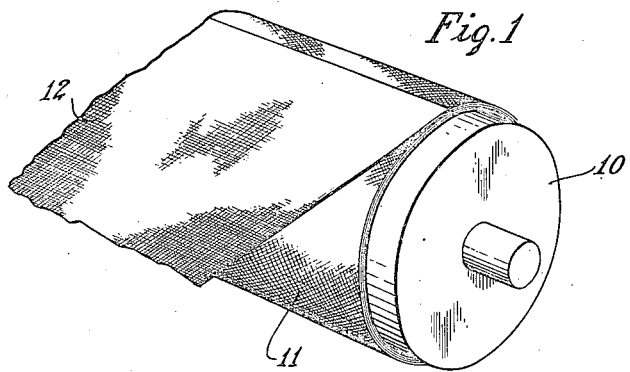
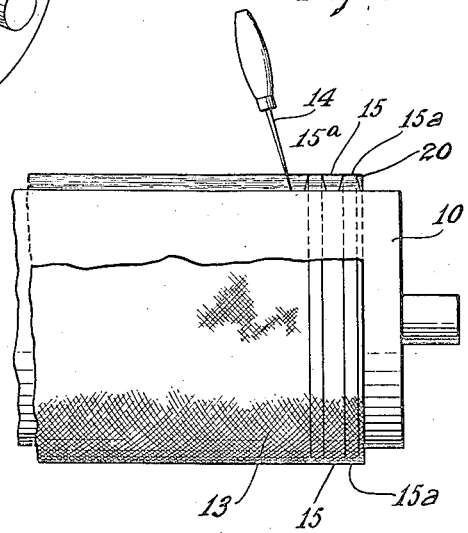
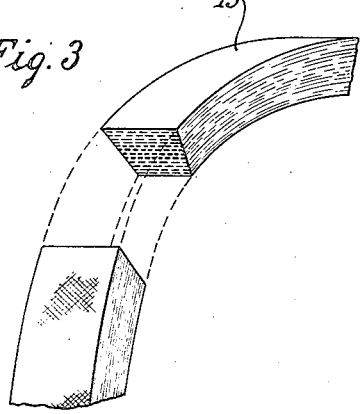
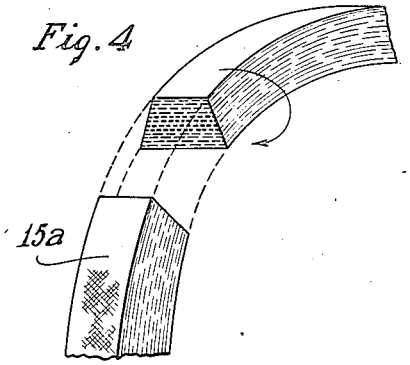
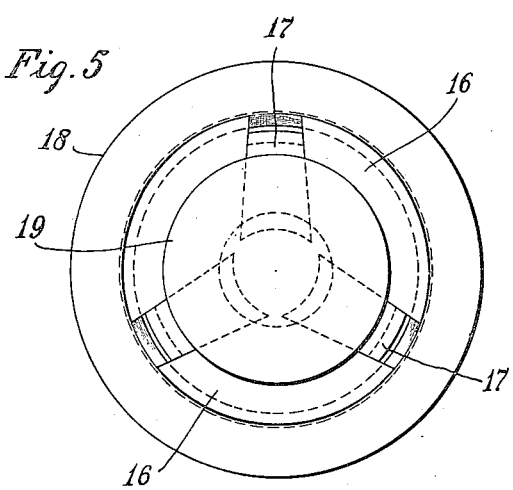
Inventor
Harold W. Delzell
By Robert McPierson
Atty.

Patented Oct. 24, 1922.

1,432,973

UNITED STATES PATENT OFFICE.

HAROLD WEBSTER DELZELL, OF AKRON, OHIO, ASSIGNOR TO THE B. F. GOODRICH COMPANY, OF NEW YORK, N. Y., A CORPORATION OF NEW YORK.

METHOD OF MAKING BELTS.

Application filed October 7, 1921. Serial No. 506,162.

*To all whom it may concern:*

Be it known that I, HAROLD W. DELZELL, a citizen of the United States, residing at Akron, in the county of Summit and State of Ohio, have invented a certain new and useful Method of Making Belts, of which the following is a specification.

This invention relates to the manufacture of laminated, endless belts or rings, and more particularly so-called V-belts of trapezoidal or similar section for use with grooved pulleys in automobile fan-belt drives and other situations. My principal object is to provide a method whereby a series of such belts or rings may be produced with a minimum of labor and material.

This method may be employed, for example, in making belts of the character described in my co-pending application, Serial No. 506,161, filed concurrently herewith.

Of the accompanying drawings, Fig. 1 is a perspective view illustrating the step of winding sheet belt-making material into tubular form on a drum.

Fig. 2 is a side elevation, partly in section, showing the cutting of the tube into complemental rings of trapezoidal section.

Fig. 3 is a sectional, perspective view of a segment of one of the rings having its wider periphery outermost.

Fig. 4 is a similar view of one of the alternate rings having its narrower periphery outermost.

Fig. 5 is a plan view of a mold in which it is preferred to vulcanize the belts.

While any suitable material may be used in making the belts, it is preferred to employ ordinary, square-woven fabric, friction coated with vulcanizable rubber on both sides and skim-coated on one side, and it is further preferred to use bias-cut fabric on the inner and outer peripheries of the belt and straight-cut fabric in the middle in order to provide a belt which is substantially inextensible as a whole but possesses the necessary body combined with a high degree of flexibility, so as to afford the minimum resistance to bending in passing around the pulleys. Fig. 1 illustrates the step of winding the fabric sheets onto a cylindrical drum 10. It may be assumed in this view that the innermost section composed of several plies of rubberized, bias-cut fabric 11 has been wound in place and the leading end of the sheet of straight-cut fabric 12 has been applied to the inner section and is about to be wound thereon in the desired number of plies, after which a second sheet of bias-cut, rubberized fabric is wound in the desired number of plies over this middle section.

The sheets are of a width sufficient to make a tube or cylinder 13 (Fig. 2) of belt-making material adapted to be cut up into a large number of relatively narrow rings by means of a knife or gang of knives held and fed into the tube 13 at such an angle as to give a predetermined slope to the convergent sides of the rings. A knife 14 is shown conventionally in Fig. 2 in the act of making a circumferential incision between two of the rings, and a previously cut ring 15$^a$ is shown in position alongside.

The rings are then removed from the drum 10 and they have respectively the form shown at 15 in Fig. 3 and at 15$^a$ in Fig. 4, the former illustrating a ring having its wider periphery and the latter a ring having its narrower periphery outermost. Each alternate ring is then turned inside-out to make it substantially uniform with those of the other set, as indicated by the arrow applied to the ring 15$^a$ in Fig. 4, which is originally cut, as shown, with its narrower periphery outermost. Preferably the belts are then dipped in rubber cement and dried.

The rings of both sets are now vulcanized in a suitable mold or molds with their wider peripheries outermost, in the form shown in Fig. 3, and it is desirable to stretch them uniformly prior to vulcanization in order to relieve the compression on the inner peripheries of the belts which have been reversed, and also to remove a portion of the crimp in the longitudinal threads of the straight-laid fabric in both sets of belts, so as to render the belts substantially stretchless in use. Good results have been obtained by stretching the raw belt substantially 7%. This stretching may take place in the vulcanizing mold itself, which for that purpose can be made with a body composed of alternating long and short grooved segments 16, 17, as represented in Fig. 5, an outer molding ring 18 and an inner wedge-cone 19.

This mold, on being assembled with a raw belt therein, is placed between the platens of a hot-plate press with the cone 19 somewhat elevated and the shorter segments 17 partially withdrawn radially between the longer segments 16. The movable platen of the press is then raised in order to expand the mold by the action of the cone 19 in wedging out the shorter segments between the longer ones until they reach the same outer circumference, the rubber meanwhile becoming soft and the belt being easily stretched for this reason and because of the bias fabric of which it is partly made. The ensuing vulcanization sets the rubber while the plies are in their stretched condition, and the result is a substantially stretchless belt of high flexibility having laminated side-driving surfaces covered with thin films of vulcanized rubber which protect the edges of the fabric before the belt goes into service, but which wear away in use and expose the laminations to afford a good gripping surface.

It will be observed that my improved method entails the expenditure of a minimum amount of labor and material, all of the material being used with the exception of the narrow strips 20 which are trimmed from the two ends of the tube 13.

I claim:

1. The method of making a series of endless, laminated belts which comprises winding belt-making material into the form of a tube, cutting said tube into complemental rings having convergent sides, and turning the alternate rings inside out to make them substantially uniform with the others.

2. The method of making a series of endless, laminated, driving belts which comprises winding rubberized fabric into the form of a tube, cutting said tube into complemental rings of trapezoidal section, turning inside out the rings which have their narrower peripheries outermost, and vulcanizing both sets of rings with their wider peripheries outermost.

3. The method of making a series of endless, laminated belts which comprises winding into tubular form concentric sections of adhesive fabric of which one section is cut straight and another is cut bias, cutting the tube into complemental rings having convergent sides, turning the alternate rings inside out, and uniformly stretching the rings of both sets.

4. The method of making a series of endless, laminated, driving belts which comprises winding into tubular form, in the order named, a sheet of rubberized, bias-cut fabric, a sheet of rubberized, straight-cut fabric and another sheet of rubberized bias-cut fabric, cutting the tube into complemental rings of trapezoidal section, turning inside out the rings which have their narrower peripheries outermost, stretching the rings of both sets and vulcanizing them in stretched condition with their wider peripheries outermost.

In witness whereof I have hereunto set my hand this 4th day of October, 1921.

HAROLD WEBSTER DELZELL.